United States Patent [19]

Drager et al.

[11] Patent Number: 5,152,321
[45] Date of Patent: Oct. 6, 1992

[54] BYPASS VALVE

[75] Inventors: Michael Drager; Edward J. Tischler, both of St. Paul, Minn.

[73] Assignee: Ecowater Systems, Inc., St. Paul, Minn.

[21] Appl. No.: 772,708

[22] Filed: Oct. 7, 1991

[51] Int. Cl.⁵ ............................................. F16K 11/07
[52] U.S. Cl. .................................. 137/625.29; 251/900
[58] Field of Search ............... 137/625.29, 625.46; 251/DIG. 900

[56] References Cited

U.S. PATENT DOCUMENTS

| | | | |
|---|---|---|---|
| 2,553,458 | 5/1951 | Jordan | 137/625.29 |
| 2,997,065 | 8/1961 | Johnson | 251/900 |
| 3,090,396 | 5/1963 | Rudelick | 137/625.47 |
| 3,643,692 | 2/1972 | Traylor | 137/625.29 |
| 3,977,433 | 8/1976 | Hankison et al. | 137/625.29 |
| 4,469,131 | 9/1984 | Traylor | 137/625.69 |

Primary Examiner—A. Michael Chambers
Attorney, Agent, or Firm—Jon Carl Gealow; James M. Wetzel; JoAnne M. Denison

[57] ABSTRACT

A bypass valve for directing a supply flow either through a treatment tank to the distribution system, or for bypassing the treatment tank and directing the supply flow through the valve directly to the distribution system. In the bypass position, the treatment tank may be physically removed from the bypass valve, the bypass valve serving as a disconnect. While in the bypass position, the valve may be actuated to pressurize the treatment tank from the supply flow.

14 Claims, 4 Drawing Sheets

BYPASS VALVE

BACKGROUND OF THE INVENTION

1. Field of the Invention

This invention relates to a bypass valve of the type commonly used with water softeners. More particularly, such valves provide two principle flow paths, one of which provides for flow into the valve from a supply, through the valve to a connected water processing tank and back through the valve from the processing tank to a system using the processed water. The other principal flow path bypasses the water processing tank, with the water flowing into the valve from a supply, and out of the valve to the system using the water, without passing through the processing tank. In the latter bypass position, the valve also acts as a "disconnect" allowing the processing tank to be physically removed from the bypass valve.

2. Description of Related Art Including Information Disclosed under Secs. 1.97–1.99

Bypass valves have been provided in the past for use with water softeners and for other applications requiring similar flow paths. Examples of such bypass valves are represented by the disclosures of the following United States Patents:

| PATENT NO. | INVENTOR | ISSUE DATE |
|---|---|---|
| 638,362 | Seahorn | 12/05/99 |
| 2,766,771 | Wenzel | 10/16/56 |
| 3,090,396 | Rudelick | 05/21/63 |
| 3,166,499 | Rudelick | 01/19/65 |

The Seahorn '362 patent shows a bypass valve which provides the same basic flow pattern as the valve of this invention, but with a different construction. The Wenzel '771 patent sets forth a control valve which utilizes O-rings in both a cylindrical and a elliptical configuration as does the bypass valve of this invention. However, in other aspects the control valve of the Wenzel patent is much different from that of this invention. The Rudelick '499 patent provides a more or less diagrammatical representation of the control valve set forth in the '396 Rudelick patent. While the diagrammatical representation of the control valve in the '499 patent appears to be of a rather simple construction, the actual construction shown in the '396 patent is much more complex. All of these patents set forth structures which either do not provide the functions which are desired in the application for which the applicants' bypass valve is intended, or only attempt to do so with a complex assembly of parts.

SUMMARY OF THE INVENTION

Accordingly, it is an object of this invention to provide a bypass valve which is of simple construction yet is fully capable of providing the desired operational features required of a bypass valve, particularly one used in a water processing system. It is a further object of this invention to provide a bypass valve which is simple to assemble from a minimum number of components and which is less expensive to manufacture than prior valves providing the same functions.

In accordance with this invention, a bypass valve is provided which is assembled from a valve body, which may be formed as a unitary molded article, a valve element, which may also be formed as a unitary molded article, a plurality of O-rings, and a snap ring. The valve body is provided with a generally cylindrical bore having open ends. Two pairs of ports are provided in the body. Both pairs of ports are generally perpendicular to the axis of the bore, with the pairs being on diametrically opposite sides of the valve body.

The valve element, which is rotatably and slidably received in the valve body, has an elongated stem of appreciable smaller cross-sectional area than the bore in the valve body. The valve element is provided with two pairs of axially spaced disks. A pair of elliptical disks formed in planes oblique to the axis o the stem are located between a pair of cylindrical disks formed in planes transverse to the axis of the stem. The outer edges of the disks are provided with grooves for supporting O-rings which form a seal between the bore and the disks.

The valve element is provided with a lever which is used to rotate the valve element from a first position in which the ports of one of the pairs of ports are connected to each other, with the ports of the other pair of ports being blocked, to a second position in which a flow path is provided from one of the ports of the first pair of ports to one of the ports of the second pair of ports, and another flow path from the other port of the first pair of ports to the other port of the second pair of ports. While in the first position, the valve element may be axially shifted to provide a flow path from the first pair of ports to one of the ports of the second pair of ports.

DETAILED DESCRIPTION OF THE PREFERRED EMBODIMENT

Figure 1:
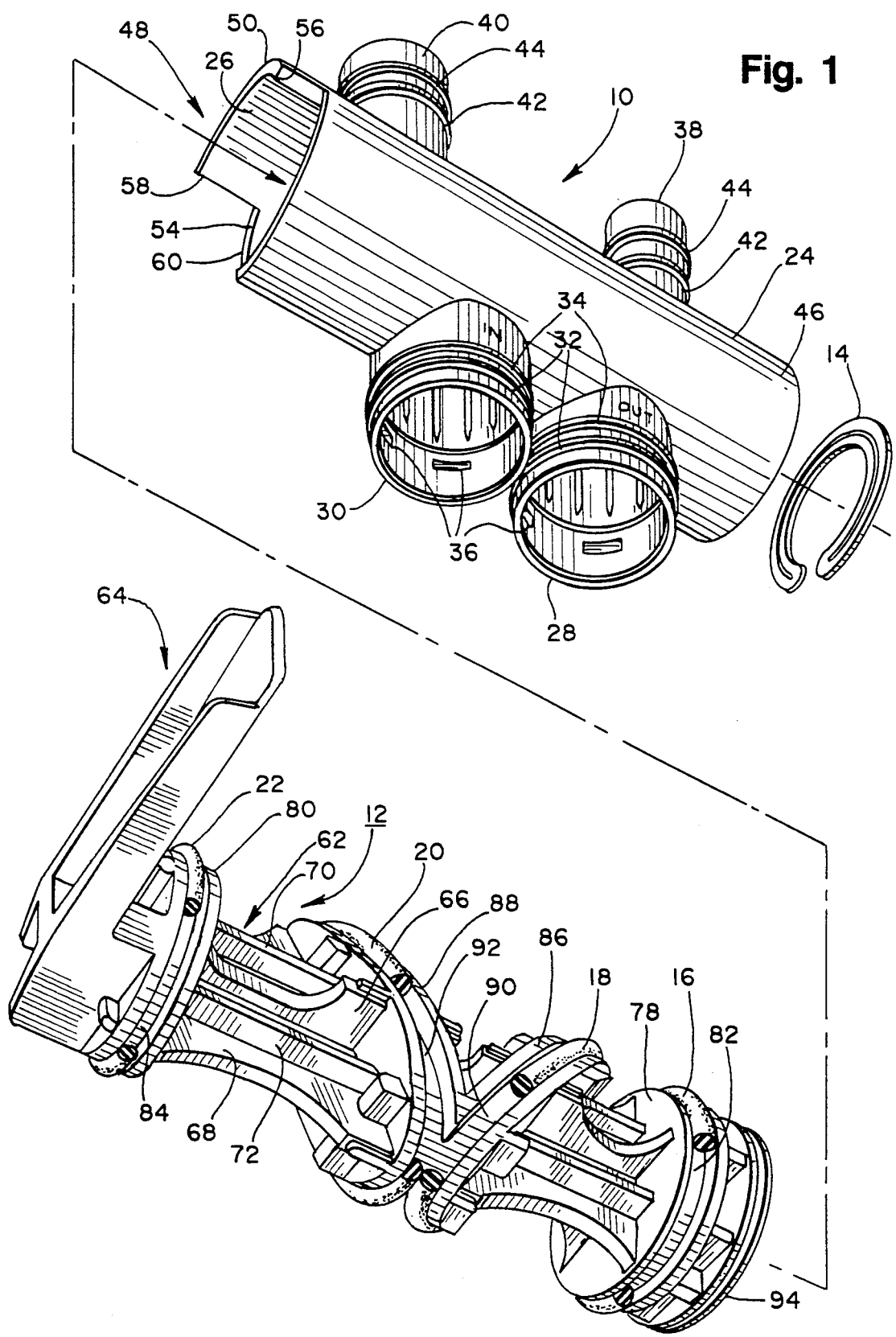
FIG. 1 is an exploded perspective view of the preferred embodiment of the bypass valve of this invention.

Referring to FIG. 1, the components assembled to form the bypass valve of the preferred embodiment of this invention will be described. The principal components of the bypass valve of this invention are an elongated valve body 10 and a valve element 12. The only other components of the simplified valve construction of this invention are a snap ring 14 and four O-rings 16, 18, 20 and 22. The elongated valve body 10 includes a generally cylindrical wall 24 having formed therein a generally cylindrical bore 26. The valve body 24 is provided with a first pair of ports 28 and 30 which are located immediately adjacent to each other and have central axes which are parallel to each other and perpendicular to the axis of the bore 26. Each of the ports 28 and 30 are in the form of hollow cylindrical tubes projecting radially from the cylindrical wall 24. The outer ends of the ports 28 and 30 are provided with a spaced pair of ridges 32 and 34 with slots 36 therebetween. By placing a snap ring (not shown) between the ridges 32 and 34, such that portions of it project through the slots 36 into the bore, a retaining means is provided for connecting the ports to supply pipes or tubes.

A second pair of ports 38 and 40 are provided on the opposite side of the valve body 10 from the first pair of ports 28 and 30. The second pair of ports 38 and 40 are spaced apart, so as to be located closer to the ends of the housing than the first pair of ports 28 and 30. As in the case of the first pair of ports, the second pair of ports 38 and 40 are also formed as cylindrical tubes projecting radially from the housing and having central axes which are parallel to each other. Again, a pair of ridges 42 and 44 are provided on the ports 38 and 40 for use in making connections to the ports.

End 46 of the valve body 10 shown adjacent the snap ring 14 is provided with a surface perpendicular to the axis of the bore 26. End 48 of the valve body 10 is provided with three stepped surfaces, each of which is formed in a plane perpendicular to the axis of the bore 26. These surfaces including an outermost surface 50, a mid-surface 52 and an innermost surface 54 are engaged by a handle 64 provided on the valve element 12 so as to ensure positioning of the valve element 12 in the desired operating positions. The edges 56 and 58 which connect the outermost surface 50 with the mid-surface 52 and the mid-surface 52 with the innermost surface 54 respectively are aligned with the axis of the bore, and provide rotational stops for the handle 64 as will hereinafter be explained. Edge 60 extending between the mid-surface 52 and the innermost surface 54 is formed at an angle to those parallel surfaces, so as to provide a ramp over which the handle of the valve element may be rotated as it passes between the innermost and the mid-surfaces.

The valve element 12 is formed with an elongated stem 62 which is connected to handle 64 which extends at right angles to the stem. The stem 62 is formed as two generally perpendicular webs 66 and 68. Additional webs 70, 72, 74 and 76 extend from the web 68 in planes generally parallel to that of webs 66. By forming the stem 62 in this manner, it is of a considerably smaller cross-sectional area than that of the bore 26, while yet being of sufficient strength to transmit the torque required to rotate the stem within the cylindrical bore 26.

Formed on the stem 62 are a pair of cylindrical disks 78 and 80. The cylindrical disks 78 and 80, which are located close to each end of the stem 62, are provided at their outer periphery with rectangular grooves 82 and 84. A pair of elliptical disks 86 and 88 are also formed on the stem 62. The elliptical disks 86 and 88 are also provided with rectangular grooves 90 and 92. The elliptical disks 86 and 88 are formed in planes oblique to the axis of the bore, at opposite angles with respect to each other, such that at their closest point, the grooves 90 and 92 open into each other. At the end of the stem opposite the handle 64, a groove 94 is formed to receive the snap ring 14.

In a preferred form of the bypass valve of this invention, the bore 26 in the housing 10 is formed so that it is slightly tapered from each end toward the middle. That is, at the center of the axially length of the housing, the bore is slightly smaller in diameter than at each end. This slight taper is advantageous from a manufacturing viewpoint. First, since the housing and the two pairs of ports are formed as an integral molded piece, a pair of plugs in the mold may be more readily withdrawn from each end of the valve body after it is formed, wherein the diameter is smaller at the center than at each end. Further, with the center of the bore being slightly smaller in diameter than that either end, it is possible to use the O-rings of the same size in the rectangular grooves in both the cylindrical disks 78 and 80 and the elliptical disks 86 and 88. Wherein the circumferential length of the grooves 90 and 92 is somewhat longer than that of the grooves 82 and 84, by using identical O-rings in the grooves on both the cylindrical and elliptical disks, those on the elliptical disks are stretched slightly more, and therefore have a somewhat smaller outer diameter for engaging the surface of the cylindrical bore 26.

In the preferred form of this invention, both the housing 10 and the valve element 12 are formed of mineral filled acetal such as "Celcon MC 90" manufactured by the Celanese Corporation. The O-rings in the preferred form of the invention are formed from bunna rubber, and the snap ring 14 is also formed from acetal, but from, an unfilled rather than a filled acetal as in the case of the valve body and the valve element.

Due to the consideration pressure exerted by the O-rings between the grooves and the bore 26 of the valve body, it is desirable when installing the valve element 12 with O-rings thereon in the bore 26 of the valve body to coat the bore and the O-rings with a silicone grease. The grease reduces the friction and makes it easier to pass the valve element 12 through the bore 26. With the valve element 12 fully seated in the bore 26, the snap ring 14 is installed in the groove 94.

Figure 2:
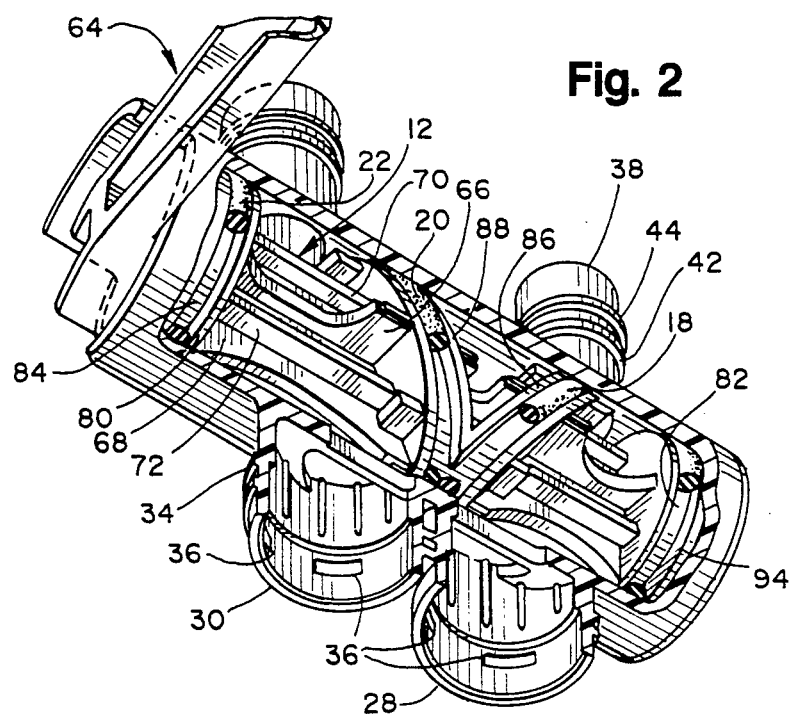
FIG. 2 is a perspective view of the bypass valve of FIG. 1, with a portion of the valve body broken away to show the valve element in a first position.
Figure 3:
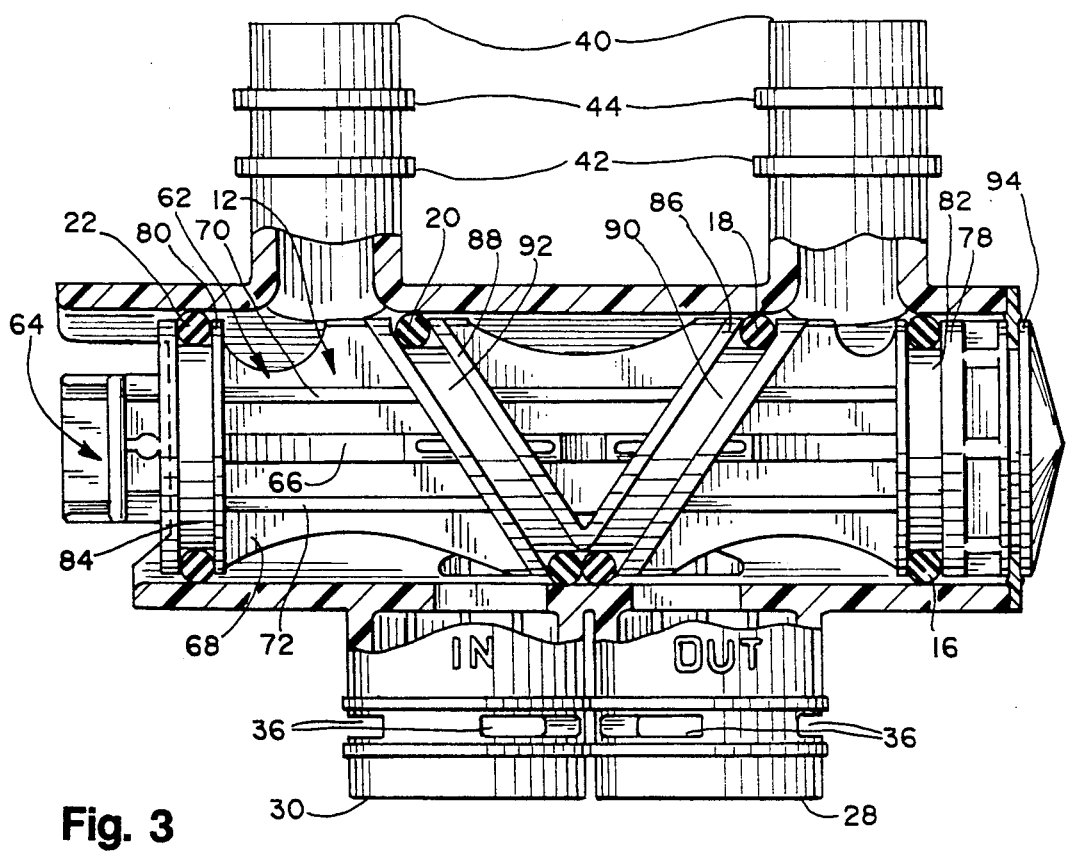
FIG. 3 is a cross-sectional view taken along the line 2—2 in FIG. 2 of the bypass valve of FIG. 1, showing the valve element in the position of FIG. 2.

By making reference to the remaining FIGS. 2 through 7 of the application, the three-flow paths provided by the bypass valve will be explained. Referring to FIGS. 2 and 3, with the handle rotated in the counter-clockwise direction until it engages the edge 56, the flow paths shown in FIGS. 2 and 3 are provided. One flow path connects port 28 of the first pair of ports with port 38 of the second pair of ports and port 30 of the first pair of ports with port 40 of the second pair of ports. In this position, the flow between ports 28 and 38 is confined to the portion of the bore between O-rings 16 and 18. Similarly, the flow between ports 30 and 40 is confined to the portion of the bore between O-rings 20 and 22. When used with a water softener, this position results in the supply of hard water to port 30 being directed to the water processing tank through port 4 and from the water processing tank through port 38 to port 28 which is connected to the distribution system.

Figure 4:
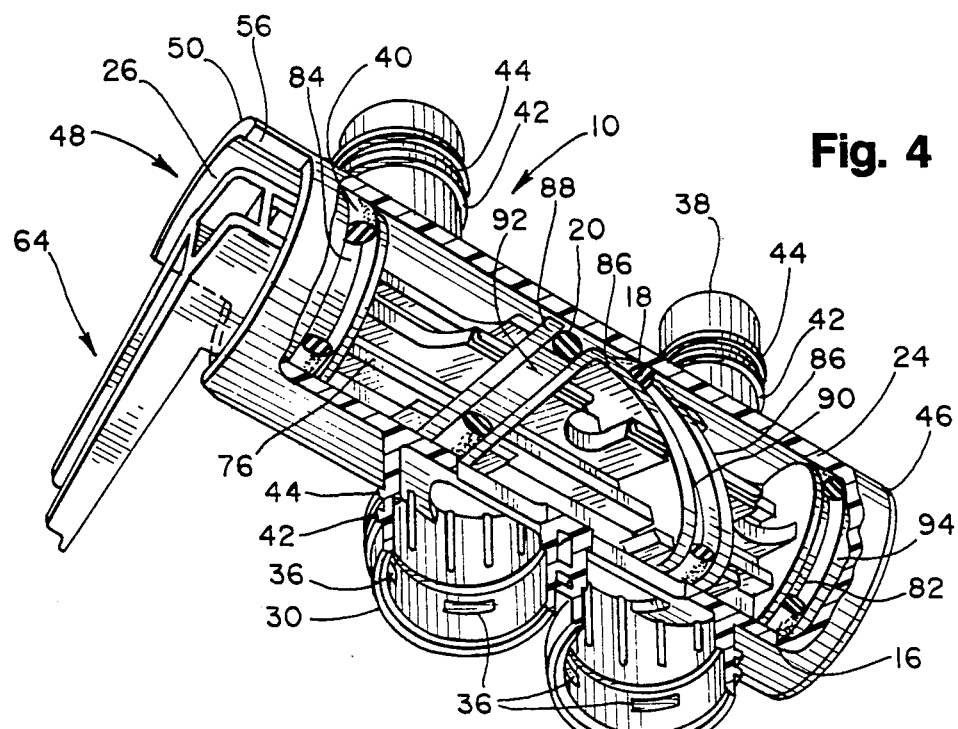
FIG. 4 is a perspective view of the bypass valve of FIG. 1, with a portion of the valve body broken away to show the valve element in a second position.
Figure 5:
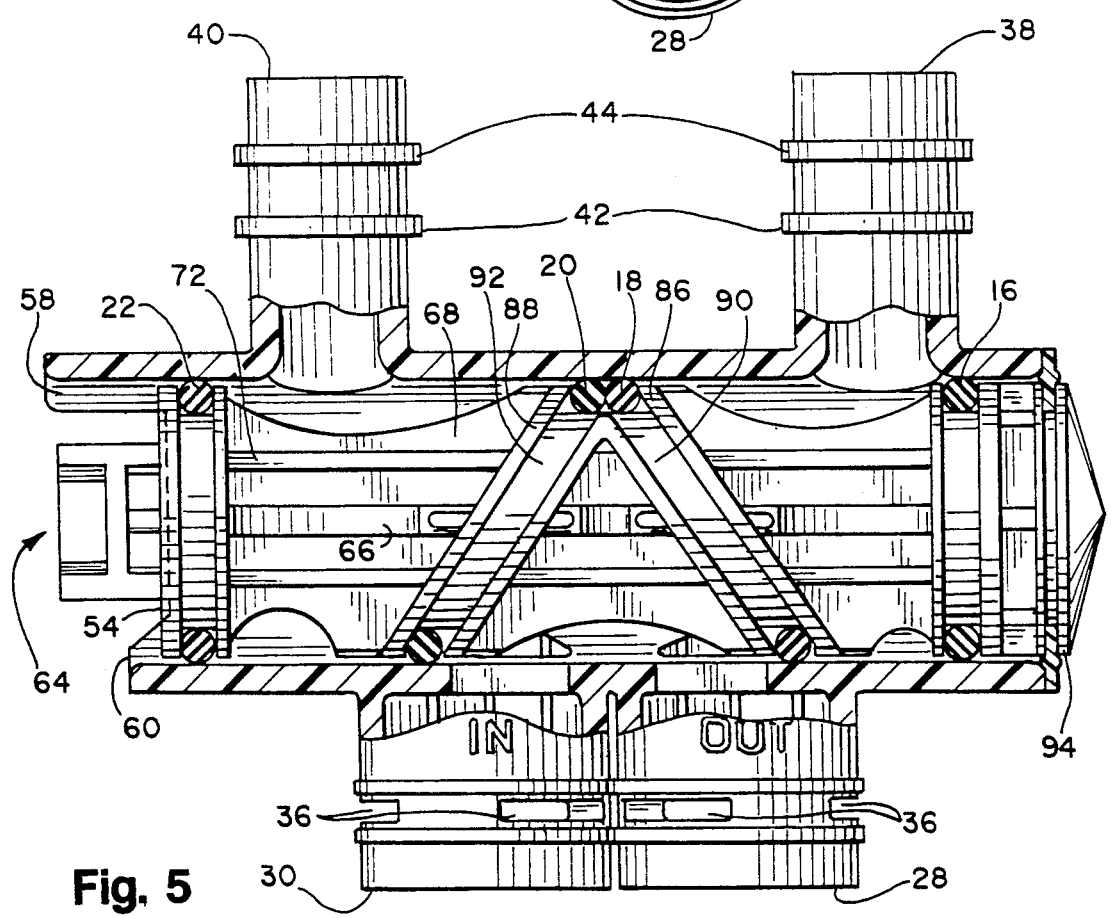
FIG. 5 is a cross-sectional view taken along the line 4–4 in FIG. 4, of the bypass valve of FIG. 1, showing the valve element in the position of FIG. 4.

When handle 64 is rotated in the clockwise direction from the portion shown in FIGS. 2 and 3 to that shown in FIGS. 4 and 5, to rest against the edge 58, as shown in FIG. 5, the valve is placed in what is considered the bypass position. That is fluid flowing into port 28 is redirected out of port 30. Further, flow through either ports 38 or 40 is blocked. The flow between ports 28 and 30 is confined in the portion of the bore between the O-rings 18 and 20 on the elliptical disks 86 and 88. While port 38 communicates with the portion of the bore between O-rings 16 and 18, there is no further flow path. Similarly, while the port 40 communicates with the portion of the cylindrical bore 2 between the O-rings 20 and 22, there is no further flow path. When the bypass valve of this invention is used in a water treatment system, the bypass position shown in FIGS. 4 and 5 is utilized to remove the treatment tank from the water flow path for purposes of regeneration or replacement. The bypass position can also be used to provide untreated water to the system when treated water is not required, such as for watering a lawn.

Figure 6:
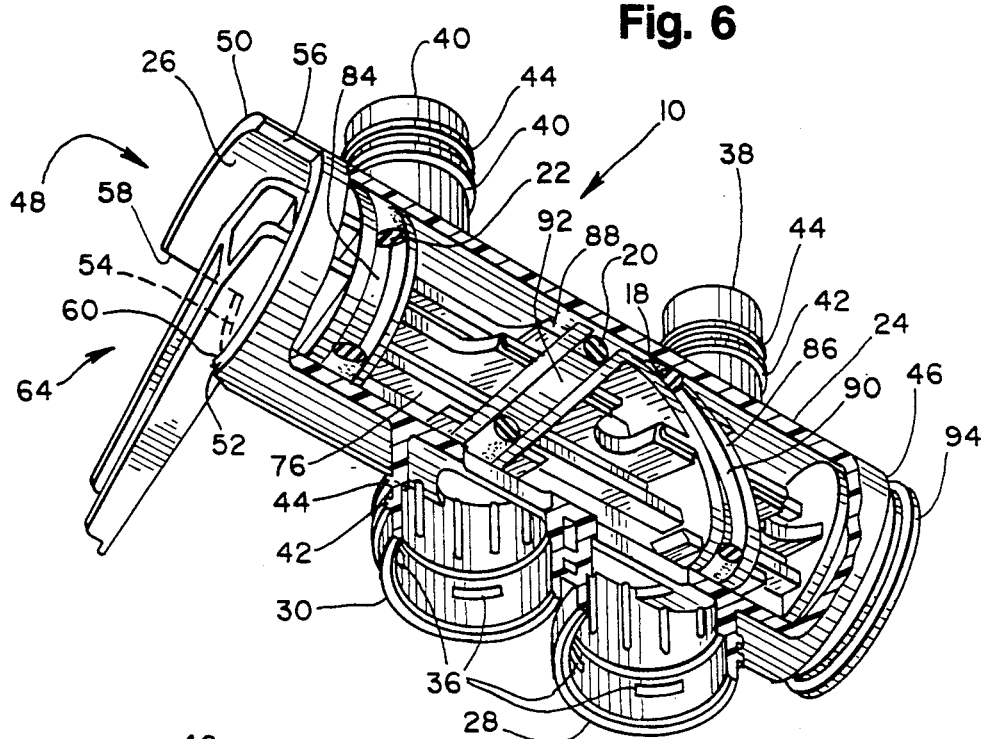
FIG. 6 is a perspective view of the bypass valve of FIG. 1, with a portion of the valve body broken away to show the valve element in a third position.
Figure 7:
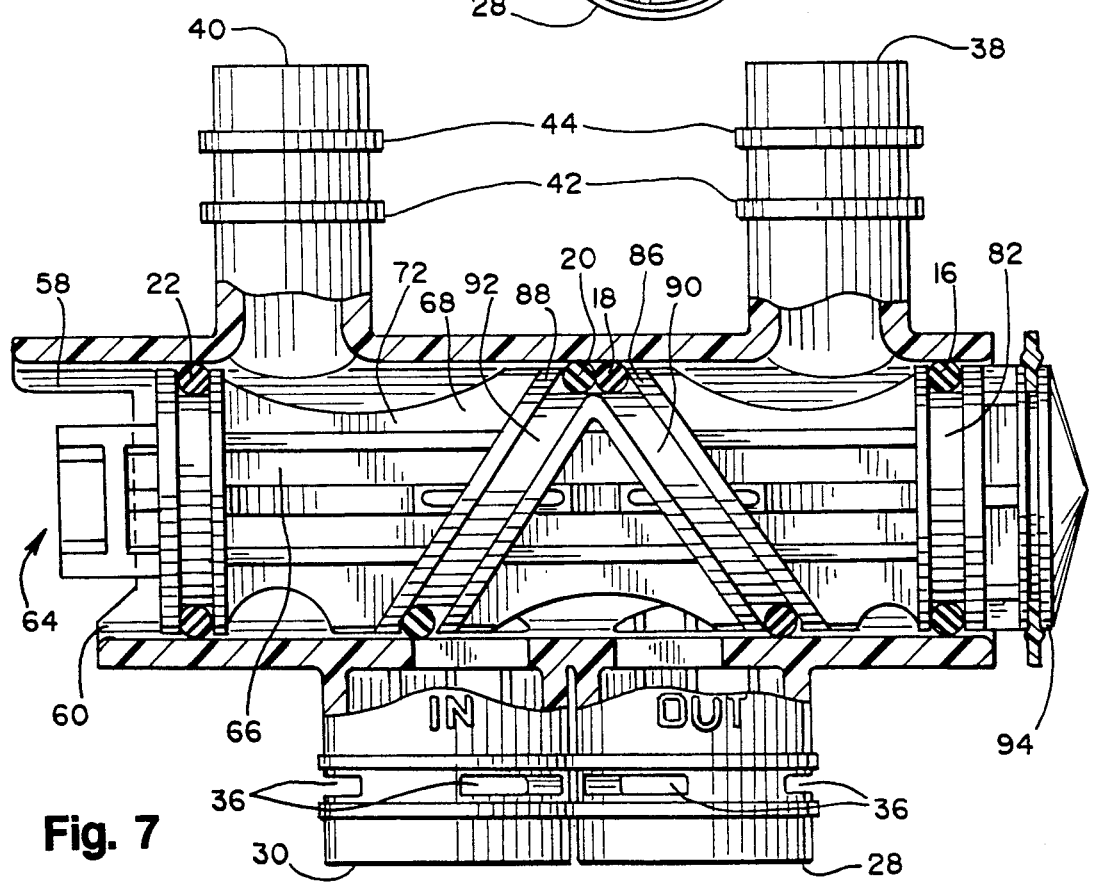
FIG 7 is a cross-sectional view taken along the line 6—6 in FIG. 6, of the bypass valve of FIG. 1, showing the valve element in the position of FIG. 6.

Referring to FIGS. 6 and 7, a third flow path provided by the bypass valve is shown. When the bypass valve is used with a water treatment system, this flow path is particularly desirable when it is not desired to place the treatment tank in the flow path, but it is desirable to pressurize the tank with the water flow from the supply for the purpose of detecting leaks or for other test purposes with respect to the treatment tank. With the lever in the position shown in FIG. 5, it is pushed axially inward toward the housing 10. In this position, the O-ring 20 in the elliptical groove 92, passes under the port 30. Such being the case, water can flow through the portion of the cylindrical bore 26 between the O-ring 20 and 22 to be passed through the port 40 to pressurize the tank connected to ports 38 and 40 from the source connected to port 28.

Thus, in accordance with this invention, a bypass valve is provided which is of simplified construction, but which readily provides three flow paths desirable for use in a water processing system such as for water softening.

It should be apparent to those skilled in the art that what has been described is considered at present to be the preferred embodiment of the bypass valve of this invention. In accordance with the patent statutes, changes may be made in the bypass valve as shown and described without actually departing from the true spirit and scope of this invention.

The appended claims are intended to cover all such changes and modifications which fall in the true spirit and scope of this invention.

I claim:

1. A bypass valve comprising:
    an elongated valve body having an outer wall with a generally cylindrical bore formed therein, said bore having first and second open ends, and
        a first pair of ports passing through said outer wall, said first pair of ports having generally parallel central axes which are generally perpendicular to the axis of said bore, and spaced apart by a first predetermined distance,
        a second pair of ports passing through said outer wall, said second pair of ports having generally parallel central axes which are generally perpendicular to the axis of said bore diametrically opposite said first pair of ports, and spaced apart by a second predetermined distance, which is greater than said first predetermined distance,
    a valve element generally received within said cylindrical bore of said valve body, and being rotatable and slidable therein, said valve element having,
        an elongated stem extending along the axis of said bore of said valve body, said stem being appreciably smaller in cross-sectional area than said bore,
        a pair of axially spaced cylindrical disks supported by said stem formed in planes transverse to the axis of said bore,
        a pair of axially spaced elliptical disks supported by said stem formed in planes oblique to the axis of said bore, said pair of elliptical disks being located between said cylindrical disks, whereby in a first rotational position of said stem with respect to said valve body, flow through one of said first pair of ports into said bore is confined between said elliptical disks and is exhausted through the other of said first pair of ports, in a second rotational position of said stem with respect to said valve body, flow through one of said first pair of ports into said bore is confined between one of said elliptical disks and one of said cylindrical disks and is exhausted through one of said second pair of ports, while flow through the other of said second pair of ports into said bore is confined between the other of said elliptical disks and the other of said cylindrical disks and is exhausted through the other of said first pair of ports, with said stem in said first rotational position, axial shifting of said stem with respect to said valve body permitting flow around one of said elliptical disks to one of said ports of second pair of ports.

2. The bypass valve of claim 1, wherein the outer edge of each of said elliptical disks and said cylindrical disks ar provided with grooves which receive O-rings which form a seal between said disks and said bore.

3. The bypass valve of claim 2, wherein the seal formed between said cylindrical disks and said bore by said O-rings prevents flow out of the open ends of said valve body.

4. The bypass valve of claim 2, wherein said bore generally has a slightly smaller diameter at the center than at either end, such that with said elliptical disks located closer to the center than said cylindrical disks, the same size O-rings can be used with both said elliptical disks and said cylindrical disks to form a seal with said bore.

5. The bypass valve of claim 1, wherein a radially extending lever is provided at one end of said stem for effecting rotation of said stem with respect to said valve body.

6. The bypass valve of claim 5, wherein the circumference of one end of said valve body is stepped so as to provide three shoulders of different axial lengths, the longest of said shoulders serving as a rotational stop for said handle, such that when said handle engages one edge of said shoulder it is in the first rotational position, and when it engages the other edge of the shoulder it is in the second rotational position, the shortest of said shoulders, being adjacent the edge of said longest shoulder which forms the stop for the first rotational position, such that said stem may be pushed into said valve body so as to axial shift said stem with respect to said valve body to permit flow around one of said elliptical disks to one of said second ports.

7. The bypass valve of claim 5 wherein a cylindrical disk is provided at the other end of said stem, with a groove being provided in the outer edge of said disk, a snap ring being received in said groove, the outer diameter of said snap ring being greater than the diameter of said bore, such that said handle and said snap ring cooperate to retain said valve element in said valve body.

8. The bypass valve of claim 1, wherein said elliptical disks are located on said stem between said cylindrical disks.

9. The bypass valve of claim 1, wherein said first ports are juxtaposition each other, as are portions of said elliptical disks, so as to reduce the overall length of the valve body.

10. The bypass valve of claim 1, wherein said valve body is formed as a unitary molded article.

11. The bypass valve of claim 1, wherein said valve element is formed as a unitary molded article.

12. The bypass valve of claim 1, wherein the cross-section of said stem is in the form of two generally perpendicular webs, with notches in the outer edges of said webs to permit flow across said webs within said bore.

13. The bypass valve of claim 12, wherein additional webs are formed on one of said webs parallel to and spaced from the other web to provide additional torsional strength to said stem.

14. The bypass valve of claim 1, wherein means are provided on each of said ports for connecting said ports to flow passages.

* * * * *